(12) United States Patent
Schleifer et al.

(10) Patent No.: US 10,946,543 B2
(45) Date of Patent: Mar. 16, 2021

(54) MICROTOME BLADE AND/OR MICROTOME BLADE HOLDER CLEANING USING ADHESIVE MATERIAL

(71) Applicant: Agilent Technologies, Inc., Santa Clara, CA (US)

(72) Inventors: Kyle Schleifer, Somerville, MA (US); Carol T Schembri, San Mateo, CA (US); Young-Ping Hwung, San Jose, CA (US)

(73) Assignee: AGILENT TECHNOLOGIES, INC., Santa Clara, CA (US)

(*) Notice: Subject to any disclaimer, the term of this patent is extended or adjusted under 35 U.S.C. 154(b) by 0 days.

(21) Appl. No.: 16/151,297

(22) Filed: Oct. 3, 2018

(65) Prior Publication Data

US 2019/0099908 A1    Apr. 4, 2019

Related U.S. Application Data

(60) Provisional application No. 62/567,448, filed on Oct. 3, 2017.

(51) Int. Cl.
| | | |
|---|---|---|
| *B26D 7/08* | (2006.01) | |
| *G01N 1/06* | (2006.01) | |
| *B08B 5/04* | (2006.01) | |
| *G01N 1/28* | (2006.01) | |

(52) U.S. Cl.
CPC ............... *B26D 7/088* (2013.01); *G01N 1/06* (2013.01); *B08B 5/04* (2013.01); *B08B 2220/01* (2013.01); *G01N 2001/2833* (2013.01)

(58) Field of Classification Search
CPC .. B26D 7/088; G01N 1/06; G01N 2001/2833; G01N 2001/061; G01N 2001/063; G01N 2001/065; G01N 2001/066; B08B 5/04; B08B 2220/01
See application file for complete search history.

(56) References Cited

U.S. PATENT DOCUMENTS

| | | | |
|---|---|---|---|
| 2004/0261597 A1 | 12/2004 | Thiem et al. | |
| 2005/0115373 A1* | 6/2005 | Kunkel | A61L 2/16 83/168 |
| 2009/0181457 A1 | 7/2009 | Schmitt | |
| 2010/0216221 A1 | 8/2010 | Walter et al. | |
| 2013/0019725 A1* | 1/2013 | Magavi | G01N 1/06 83/24 |
| 2014/0345433 A1 | 4/2014 | Studer | |
| 2015/0168277 A1 | 6/2015 | Magavi et al. | |
| 2015/0198509 A1 | 7/2015 | Williamson et al. | |
| 2016/0202150 A1* | 7/2016 | Schlaudraff | G01N 1/286 435/30 |
| 2017/0030810 A1* | 2/2017 | Stephens | G01N 1/06 |
| 2017/0074755 A1* | 3/2017 | Adiga | G01N 1/06 |
| 2017/0160535 A1* | 6/2017 | Mitra | G01N 1/286 |
| 2017/0284904 A1* | 10/2017 | Lim | G01N 1/06 |

OTHER PUBLICATIONS

U.S. Appl. No. 15/445,585, filed Feb. 28, 2017, entitled "Apparatus and Methods for Transferring a Tissue Section," 29 pages.

\* cited by examiner

*Primary Examiner* — Omar Flores Sanchez

(57) ABSTRACT

The present disclosure related to apparatus and methods for removing waste of debris from a microtome blade, a microtome blade holder, or both. The invention also relates to automated systems and methods for cleaning a microtome.

24 Claims, 7 Drawing Sheets

US 10,946,543 B2

MICROTOME BLADE AND/OR MICROTOME BLADE HOLDER CLEANING USING ADHESIVE MATERIAL

CROSS-REFERENCE TO RELATED APPLICATIONS

This application claims benefit of the filing date of and right of priority to U.S. Provisional Application No. 62/567,448, filed Oct. 3, 2017, which is incorporated by reference herein.

FIELD OF THE INVENTION

The present invention relates to apparatus and methods for removing waste and debris, such as partial tissue sections, from a microtome blade, a microtome blade holder, or both. It also relates to automated systems and methods for removing the waste or debris from a microtome blade, a microtome blade holder, or both and, optionally, depositing the waste or debris into a receptacle.

BACKGROUND OF THE INVENTION

Microtomes are used to cut extremely thin slices of samples, such as tissue, known as tissue sections, for microscopic observation under, for example, transmitted light, emitted light (such as fluorescent emissions in fluorescent in situ hybridization) or electron radiation. Samples, such as tissues, are typically embedded in mounting media blocks, such as, for example, paraffin, resin or frozen media, prior to sectioning. Microtomes use extremely sharp blades to slice thin sections of a desired thickness from a sample. Microtome blades can be made from various hard materials including, but not limited to, steel, glass and diamond. The blade is held in place by a blade holder. The sample, such as a tissue sample, is brought into contact with the blade in order to cut thin sections from the sample surface at selected thicknesses. The tissue sections can then be retrieved from the microtome, usually by manual retrieval, such as by an operator using a grasping tool, transferred to a slide, and examined with an optical or an electron microscope or by other techniques. Because the tissue sections are extremely thin, with some ultramicrotome sections, for example, having sub-micron thickness, they may be difficult to collect and transfer without damage or contamination. Microtome blades are also referred to and known as microtome knives by the skilled artisan. The terms "blade" and "knife" are used interchangeably in the instant disclosure.

A rotary microtome such as the Leica RM2125 RTS or Leica RM2255 comprises a handwheel that moves a sample holder downward, so that the held sample is sliced by the knife. The rotary microtome has a housing on which a knife holder, the sample holder, the handwheel and other elements are all assembled, with various clamps for holding the moving pieces in position. The knife holder typically includes a front plate, and the sliced tissue section may lie on the front plate after slicing. The slicing is a manual operation, with each section being sliced via rotation of the handwheel. A schematic representation, in perspective view, of a standard rotary microtome is presented in FIG. 1.

US Patent Application Publication No. 20040261597 to Thiem et al. discloses a rotary microtome having a base part on which a microtome housing and a knife holder are arranged. A collection element surrounds the knife holder on three sides and has a U-shaped base outline. Several clamping levers are associated with the knife and knife holder, the clamping lever to the knife holder is on the outside of the collection element, reducing the number of levers on the knife holder and simplifying cleaning. The collection element is configured so that tissue sections may be easily cleaned out of it and so that the user does not get caught on it or the microtome housing.

US Patent Application Publication No. 20100216221 to Walter et al. discloses a device for applying a histological section to a slide. The histological section is generated by a cutting action performed by a blade of a microtome. The device comprises a positioning device having a component that is rotatably mounted to a bearing and has a receptacle for receiving and holding the slide, wherein the positioning device is designed such that the slide received in the receptacle can be rotated about an axis of rotation of the rotatably mounted component.

US Patent Application Publication No. 20090181457 to Schmitt discloses an apparatus and a method for isolating histological sections produced with a microtome. A previously and currently produced histological section are connected to form a section strip. In order to simplify isolating the previously and currently produced histological sections from each other, a nozzle device is provided by means of which the histological sections when positioned on a blade holder are subjected to an air stream of adjusted direction and intensity so that the previously produced histological section of the section strip is separated from the currently produced histological section that is positioned on the blade holder and is removed from the blade holder.

US Patent Application Publication No. 20150168277 to Magavi et al. discloses apparatuses and methods for handling a portion of a tissue sample when sectioned by a microtome. The apparatuses include a container, a tissue sample holder in the container, and one or more outlets configured to allow flow of a fluid from the container. The flow through the outlet causes a portion of the tissue sample sectioned by a microtome to move into the outlet. The methods include sectioning one or more portions of a tissue sample, and flowing a fluid past the tissue sample to cause the one or more portions of the tissue sample to move away from the tissue sample and toward at least one fluid outlet.

US Patent Application Publication No. 20150198509 to Williamson et al. discloses an automated machine for handling and embedding tissue samples contained on microtome sectionable supports. The machine includes an input member configured to hold a plurality of the microtome sectionable supports prior to a tissue embedding operation. An output member is configured to hold a plurality of the microtome sectionable supports after the tissue embedding operation. A cooling unit is configured to hold at least one of the microtome sectionable supports during the tissue embedding operation. A motorized carrier assembly is mounted for movement and configured to hold at least one of the microtome sectionable supports. The carrier assembly moves the support from the input member to the cooling unit and, finally, to the output member. A dispensing device dispenses an embedding material onto the microtome sectionable support and at least one tissue sample carried by the microtome sectionable support during the embedding operation.

A traditional approach for slicing tissue sections using a microtome involves creating a strip or ribbon of tissue sections from a tissue sample (such as a tissue embedded in paraffin). After a tissue section is created, the trailing edge of the section adheres to the knife, which allows an attachment point between the sliced tissue section and a subsequently sliced section, and so on, thereby creating a ribbon of tissue sections. Often only one or two sections from the ribbon are actually used and mounted onto a slide, since the first section sliced by the microtome is hard to manipulate without damage. This causes the first section to be a sacrificial section and waste of the sample. Often the first section of the ribbon will curl or collide with the knife holder, requiring the user of the microtome to intervene so as to remove the tissue section. If the first section sliced from the sample block could be obtained without this user intervention, the first section could be used directly and it would remove the need to create a ribbon.

US Patent Application Publication No. 20140345433 to Studer discusses a device for transferring a section ribbon to a specimen holder for use in transmission electron microscopy (TEM), the section ribbon being transferred to the specimen holder by way of an ionization device in a microtome apparatus.

The "Static-Line" II from DiATOME (Hatfield, Pa.) is an anti-static device which emits negative and positive ions neutralizing electrostatic charges. It is marketed for use in ultramicrotomy, so that tissue sections no longer stick to the knife edge or bunch up on each other, but rather float in a ribbon over the surface of the knife.

When a microtome is used to slice sections, such as, for example, from a Fixed Formalin Paraffin Embedded (FFPE) tissue block, a significant amount of debris is created. The debris often collects on the blade and blade holder. This debris buildup can cause issues such as cross contamination, shredding of the tissue section, and damage to the blade edge.

Standard histology labs using state of the art manual microtomes typically use brushes to sweep away waste and debris, such as partial tissue sections, from the microtome blade and blade holder. Use of a brush to sweep away debris is a flawed approach that is fraught with at least three fundamental problems. First, when debris, such as paraffin, is stuck to the blade, a histology technician must gently sweep the brush up over the blade edge to remove the debris. However, brushing over an extremely sharp microtome blade often results in defects in the blade's cutting edge rendering the blade unworkable and requiring it to be replaced.

The second fundamental problem is that some waste or debris, such as paraffin, often becomes stuck to the blade holder and can only be removed periodically by wiping down the surface with a solvent.

The third problem is that tissue or genomic material from a first tissue block may remain on the blade, blade holder or elsewhere on a surface of the microtome and be picked up by a subsequent section causing cross-contamination of following tissue sections and/or tissue blocks. Such cross-contamination impairs the practitioners' ability to perform downstream analysis, such as molecular, sequencing and/or genomic analysis, as the subsequent approaches are sensitive enough to be ruined by the cross contaminated materials. Accordingly, current practitioners are required to change blades between every tissue block when molecular tests may be necessary.

Some automated microtomes attempt to utilize alternative approaches to removing waste and debris from microtome blades and blade holders. For example, the Sakura automated microtome employs a vacuum suction to remove debris as the section is being trimmed. Additionally, the Dianippon Seiki automated microtome uses a puff of air to direct debris into a waste area beneath the blade. While these approaches may decrease the amount of debris collecting on the blade holder, they do not necessarily remove all the debris from the blade itself. These automated microtome approaches are particularly limited when relatively small pieces of debris become adhered to the surface of the blade. Accordingly, when an automated microtome practitioner encounters this issue, the solution is to change blades; the same solution employed by a manual microtome user.

Apparatus and methods for automated removal of waste or debris from a microtome blade and/or microtome blade holder and depositing the waste or debris into a receptacle would increase efficiency and quality of tissue sectioning and additional downstream analyses, such as molecular analysis.

SUMMARY OF THE INVENTION

The present disclosure provides methods and apparatus for removal of debris from microtome surfaces, blades and blade holders. In some embodiments, the present methods and apparatus utilize an adhesive material to contact a microtome blade and/or microtome blade holder, such as the apparatus described in U.S. patent application Ser. No. 15/445,585, which is incorporated herein by reference in its entirety. In some embodiments, U.S. patent application Ser. No. 15/445,585 utilizes an adhesive material to manipulate tissue samples. The present disclosure utilizes adhesive materials, such as adhesive tape, to remove waste or debris on the microtome blade, on the microtome blade holder, or both. In particular embodiments, the adhesive material containing the waste and debris are deposited into a receptacle. In additional embodiments, further cleaning by reagents can dissolve more firmly adhered and/or minute quantities of debris to prevent cross contamination.

In other embodiments, the use of the adhesive material to pick up a tissue section, as described in U.S. patent application Ser. No. 15/445,585, or remove debris can have an additional function such as being marked or printed with section identification information prior to being used to pick up a section or to remove debris.

The present disclosure provides advantages over previous solutions by providing, in some embodiments, the ability to remove bits of paraffin debris that are either too small or too firmly adhered to the blade or blade holder surface to be removed pneumatically. Thereby, the present technology extends the life of the microtome blades, reduces the amount of operator intervention for maintenance, and generates higher quality tissue sections. Other embodiments of the present technology also provide microtome surface, blade and blade holder cleaning that eliminates the risk of cross contamination with subsequent samples. The elimination of cross contamination is of particular importance in embodiments of the technology that include molecular analysis such as genomic analysis and sequencing.

As another aspect of the present invention, a barcode or identification feature can be applied to the adhesive material prior to pick-up in order to identify the material (waste or debris, or tissue section) removed. In these embodiments, this material that is removed can be either the section placed on a slide, or debris placed in a receptacle. These embodiments enable identification of the material on the adhesive tape and can be useful in case of power outage or if the section or debris needs to be recovered for genomic or other testing.

In some embodiments, the present apparatus and methods comprise a combined vacuum and tape debris removal system, where vacuum or suction is used to hold an adhesive material which contact the microtome blade, the microtome blade holder, or both, to remove waste or debris therefrom.

In some embodiments, the adhesive material is being held by vacuum to an end effector. The microtome blade, the microtome blade holder, or both, are significantly cleaner once the adhesive material is contacted and retracted.

In some embodiments, the present apparatus and methods comprise a reel to reel tape system, in which an adhesive material such as an adhesive tape is unreeled from a first reel and re-reeled by a second reel. The reels are held by a reel holder, and the unreeled tape is placed in contact with or in sufficient proximity to the debris such that the debris is collected by the debris collector. The reel to reel tape system can be configured for moving the adhesive tape into contact with and away from the microtome blade. In some embodiments, an actuator can be utilized to press an adhesive material (such as adhesive tape) onto a microtome blade and/or microtome blade holder, then the actuator can be released, such as by retracting away from the microtome blade and/or microtome blade holder. In some embodiments, adhesive tape is advanced between reels to expose fresh adhesive material. In some embodiments, the reel to reel tape system may be integrated into a tissue or debris collector arm as described by the present disclosure. In other embodiments, the reel to reel tape system may be separate from the tissue/debris collector arm and brought into contact with the microtome blade or microtome blade holder by the tissue/debris collector arm or by a different actuator. For instance, the reels can be held by a reel holder configured for moving the adhesive tape into contact with and away from the microtome blade.

Additional embodiments of this technology utilize the end effector to pick up media which is soaked with DNase, RNase, pepsin, xylene or other reagent and use it to clean the blade and/or blade holder to reduce the possibility of cross contamination or dissolve paraffin. In alternative and/or additional embodiments, the blade and blade holder can be sprayed with any of these reagents. In some embodiments, the end effector or other vacuum source can remove the reagents. In additional embodiments, the end effector can pick up absorbent media to remove this reagent.

DETAILED DESCRIPTION OF THE INVENTION

Figure 1:
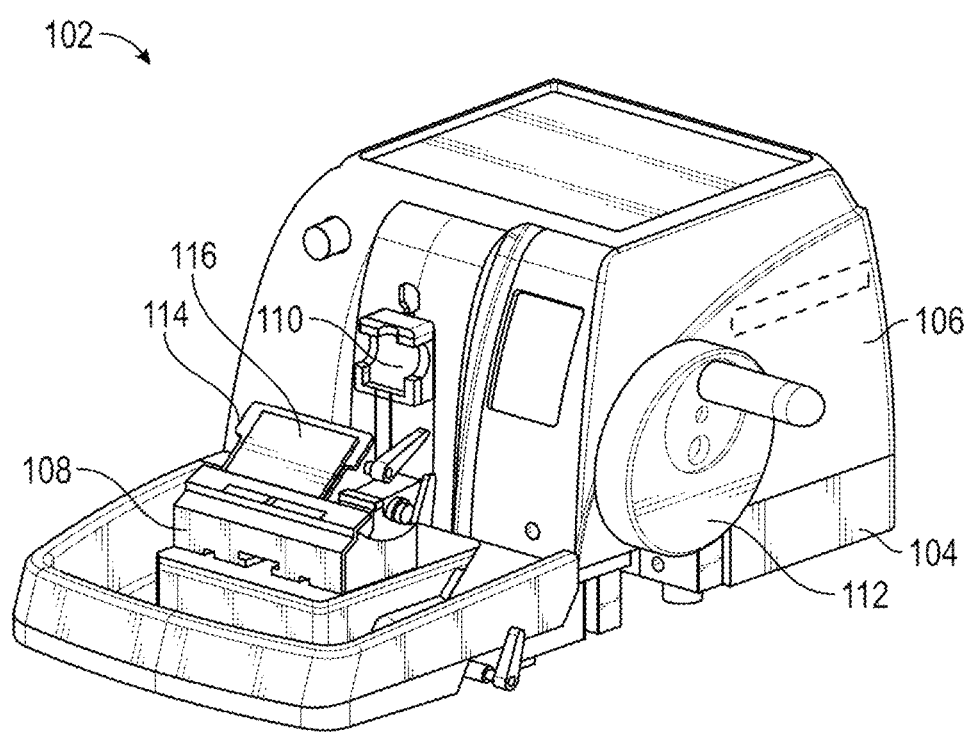
FIG. 1 is a perspective view of standard rotary microtome.

This invention is based, at least in part, on use of an automated apparatus for removing waste or debris, such as partial tissue sections, from a microtome blade and/or blade holder and, optionally, depositing the waste or debris into a receptacle.

I. Definitions

A "pneumatic" apparatus contains or operates by air or gas under positive and/or reduced pressure. A pneumatic source is a source of positive pressure and/or reduced pressure, and commonly employs compressed air or inert gases as positive pressure gases, or a pump may be used to create positive pressure or reduced pressure. Other pneumatic sources include bellows or bulb syringes, which may be actuated manually or automatedly. The positive pressure source may be a tank of pressurized oxygen, nitrogen, air or another gas. Alternatively, the pneumatic source may be a pump. A valve may be provided to control the pressure from the pneumatic source. The pneumatic source or its valve can be in signal communication and/or controlled by a controller. The controller for the pneumatic source can also be in signal communication with and configured to control other apparatus, such as the tissue collector described below.

"Positive pressure" is a pressure greater than the surrounding environment, such as greater than atmospheric pressure. The pressure gradient between positive pressure and the ambient pressure will propel a material, such as an adhesive material, debris or a tissue section away from the positive pressure and toward the lower pressure area.

"Reduced pressure" is a pressure less than the surrounding environment or a sub-ambient pressure. "Suction" is the flow of gas into a partial vacuum or region of reduced pressure. The pressure gradient between this region and the ambient pressure will cause a material, such as an adhesive material, debris or tissue sections, to move toward the reduced pressure area. In some embodiments, a sub-atmospheric pressure is a reduced pressure.

A "tissue section" is an extremely thin slice of a tissue which may be suitable for microscopic examination, for example, from about 1 to about 100 microns, alternatively from about 1 to about 30 microns, alternatively from about 3 to about 10 microns. A "partial tissue section" is a tissue section which has been damaged or torn and therefore does not include a complete slice from the tissue block and/or which is not suitable or desirable for analysis as a tissue section or for placement on a slide.

Microtome "debris" or "waste" is scrap material that is generated when tissue sections are sliced from a block of tissue mounting media. Debris and/or waste may include small pieces of tissue or mounting media, such as paraffin, that may become attached to the microtome blade, blade holder, or other surface of the microtome. Debris and/or waste may have some utility even though it is not suitable or desirable for use as a tissue section, and in some embodiments, may be used for other purposes, such as genomic analysis.

II. Microtome

FIG. 1 is a perspective view of standard rotary microtome 102. The rotary microtome 102 comprises a base 104 and a microtome housing 106 provided on the base. A knife holder 108 is placed on the base 104. Opposite to the knife holder 108 on the microtome housing 106 is a sample holder 110. The sample holder can be moved up and down by means of a handwheel 112 provided on microtome housing 106. Knife holder 108 and sample holder 110 are typically arranged oppositely from one another. The knife holder 108 supports a front plate 116, which may be a knife pressure plate which applies pressure to the knife 118. The knife holder 108 is supported by various clamps and supports. The knife holder 108 can be moved linearly along rails to adjust the thickness sliced from a tissue sample. The sample holder can also be moved to adjust the thickness. It also allows adjustment of the angle at which the knife 114 contacts the tissue sample. The rotary microtome is shown and described as an example, as the present apparatus and methods can also be used with other types of microtomes. The microtome can be a manually operated microtome, as shown in FIG. 1, or it can be an automated microtome.

III. Microtome Blade Holder

Figure 2:
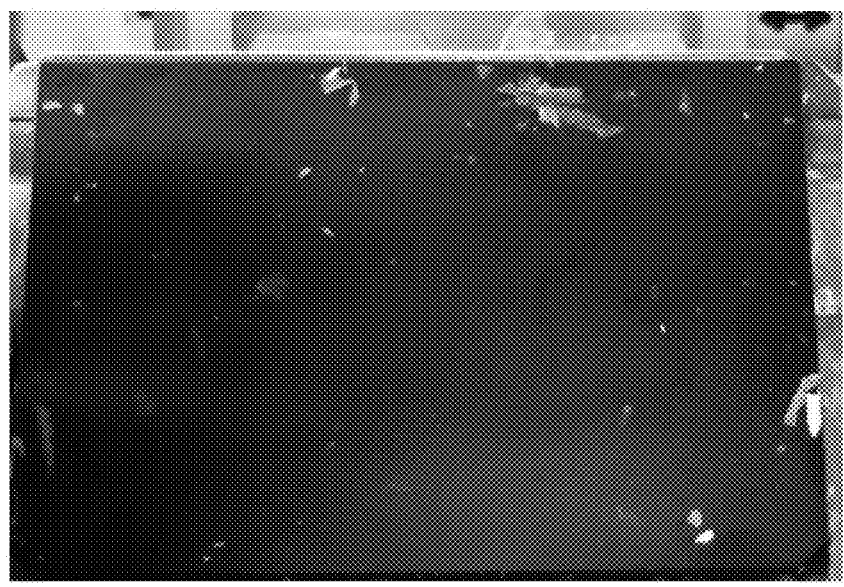
FIG. 2 is a photograph of a standard microtome blade and microtome blade holder with debris on its surface.

FIG. 2 shows an embodiment of a microtome blade holder. The blade holder can be manipulated by various clamps and supports in order to adjust the blade for desired tissue sectioning. The blade holder and blade are both present in close proximity to one another and to the tissue block that is being cut into tissue sections. Thus, the blade and blade holder are susceptible to being contaminated with sectioning waste and debris, such as partial tissue sections and remnants of tissue mounting media as can be seen on the surface of the blade holder pictured in FIG. 2.

Figure 3A:
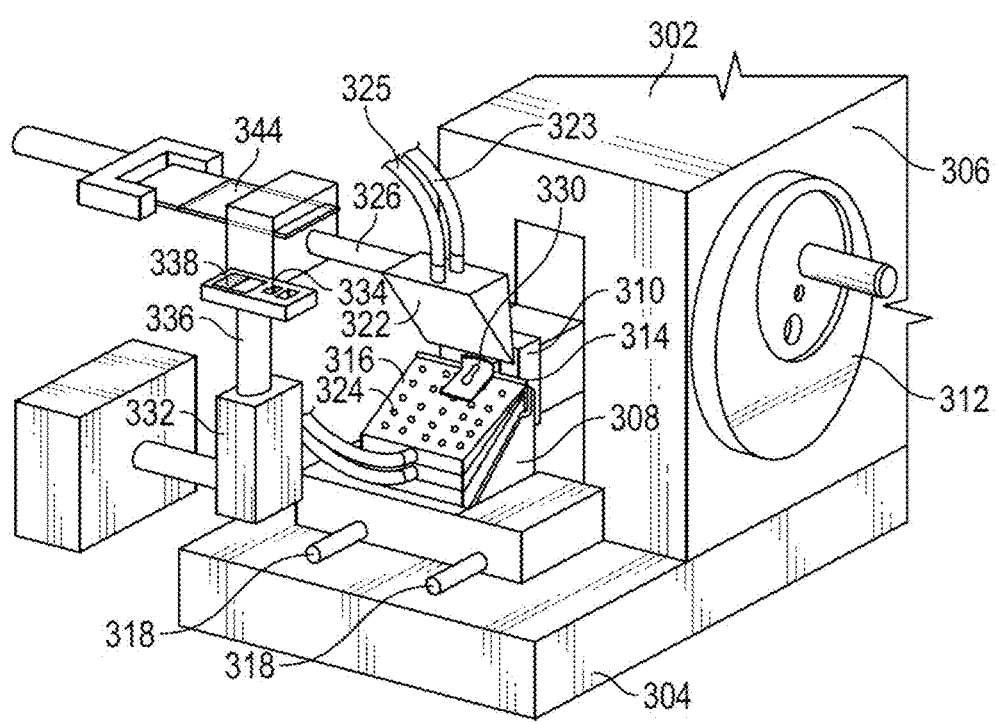
FIGS. 3A to 3C are perspective views of an apparatus for tissue section collection and transfer.
Figure 3B:
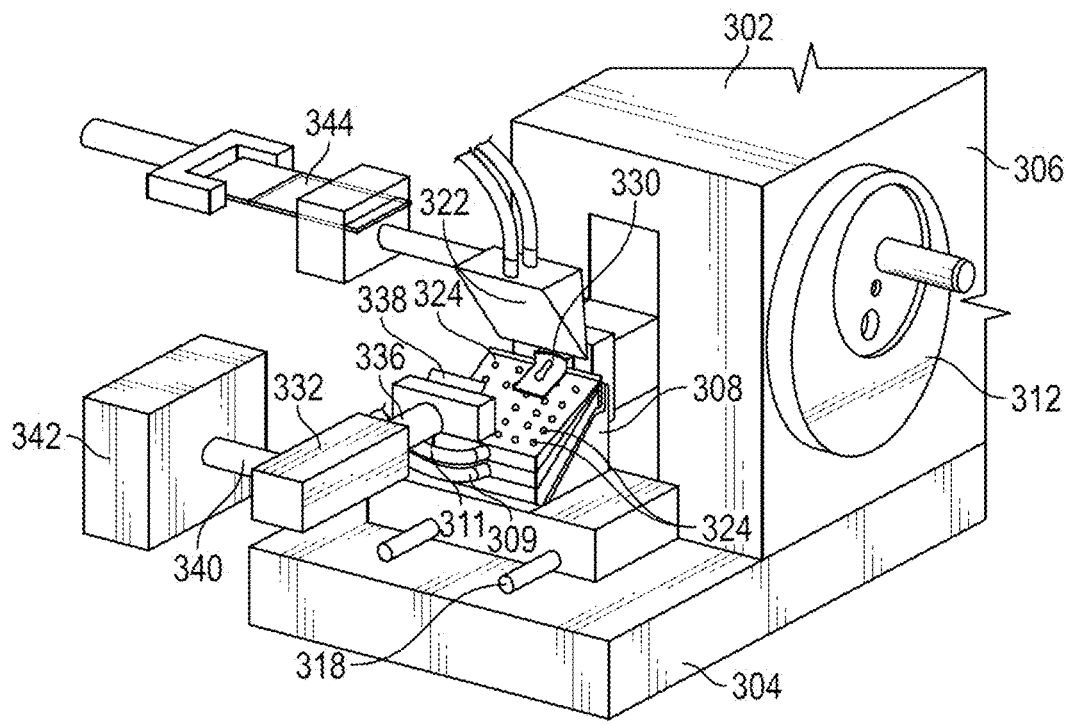
Figure 3C:
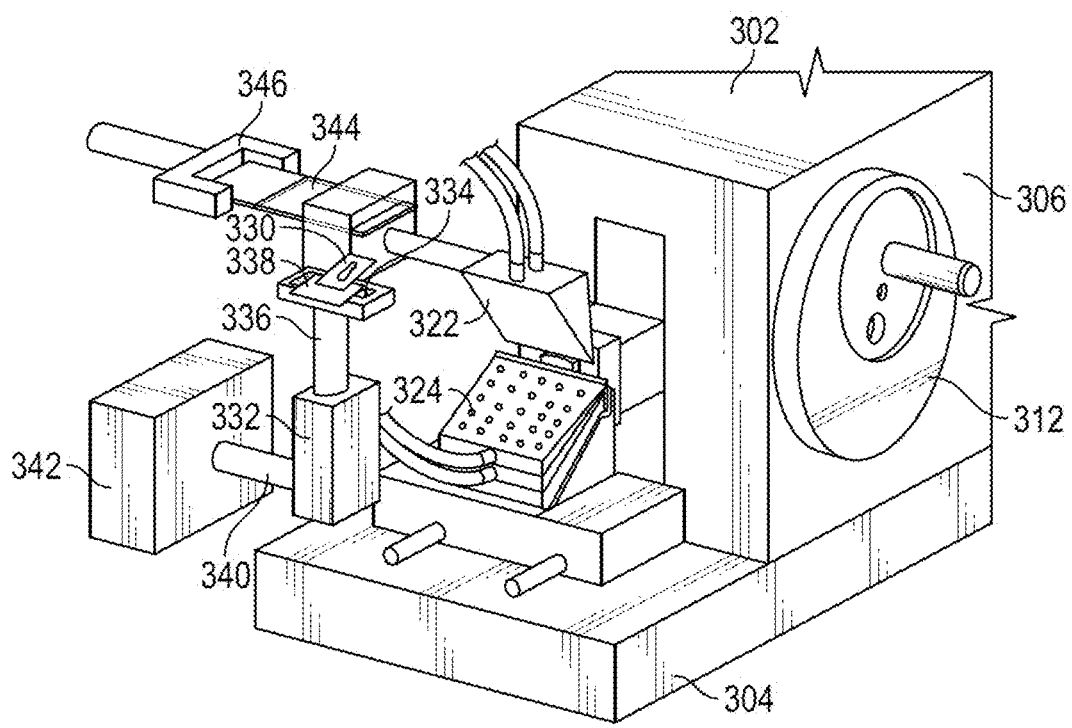

IV. Method and Apparatus for Transferring a Tissue Section and/or for Cleaning FIG. 3A to 3C are perspective views of an apparatus for automated tissue section transfer. The present methods and devices for cleaning can be included in the apparatus. In FIG. 3A, a tissue section has been sliced by the knife 314 of a microtome, with the aid of an air blade. The tissue section rests on the front plate of the knife holder, optionally supported by a cushion of air or other gas. In FIG. 3B, a tissue collector is rotated toward a position where it will collect the tissue section from the front plate. In this embodiment, the tissue collector has an extendible arm and an adhesive strip attached to the arm, and it extends to collect the tissue section from the front plate. In FIG. 3C, the tissue collector has moved to a position where the tissue section and the adhesive strip are attached to a slide and released from the tissue collector. In the present disclosure, it is contemplated that an adhesive material held by the tissue collector is used to clean a microtome blade, a microtome blade holder or both. In the embodiment shown in FIG. 3A to 3C, it is contemplated that the tissue collector also functions as a debris collector, in that the same extendible arm is adapted and used for collecting tissue sections and for removing debris or waste. However, it is also contemplated that the present methods and devices can comprise separate tissue collector(s) and debris collector(s). Thus, the tissue collectors described herein also exemplify general collectors for microtomes that perform multiple functions, including but not limited to tissue collection and debris collection. The tissue collectors described herein also individual collectors that perform a specified function, including but not limited to tissue collection or debris collection.

More particularly in FIGS. 3A to 3C, the apparatus includes a rotary microtome 302, which may be a previously existing design or a new design adapted for use with the apparatus and methods of the present disclosure. For example, the rotary microtome 302 may include a base 304 and a microtome housing 306 provided on the base 304. A knife holder 308 is located on the base 304. A sample holder 310 can be moved up and down by means of a handwheel 312 provided on microtome housing 306. The knife holder 308 and the sample holder 310 are arranged oppositely from one another. The knife holder 308 supports a front plate 316 (also called a knife pressure plate) which applies pressure to the knife 314. The knife holder 308 is supported by various clamps, supports and rails 318. The sample holder 310 can be adjusted to select the thickness sliced from a tissue sample. The orientation of the knife and knife holder in relation to the tissue sample holder can be manipulated to allow adjustment of the angle at which the knife 314 contacts the tissue sample.

In some embodiments, the apparatus is operated as follows. A tissue sample is securely clamped or inserted into the sample holder 310, which is moved about the knife 314 and locked in place at that point. The knife holder 308 is moved into the desired position, where it will slice a tissue section of desired thickness, and locked or clamped in place. The gas supplier 322 is activated so as to blow a gentle line of positive pressure gas from conduits 323, 325. A pneumatic source (the same or different than that feeding the gas supplier 322) is activated to supply positive pressure gas to the front plate 316, where it passes through small apertures 324 on the front plate to provide a bed of gas on the front plate 316. The operator then turns the handwheel 312, lowering the sample holder 310 so the tissue sample engages the knife 314. In some fully automatic microtome systems, the operator and handwheel may be replaced by full automation or partial automation. As the tissue section 330 is sliced, positive pressure gas from the gas supplier 322 and apertures 324 blows on the tissue section 330, thereby reducing or preventing deformation (such as curling or bunching) of the tissue section 330. Positive pressure gas is supplied to apertures via conduit 309, the front plate may include a flow path adapted for blowing gas from conduit 311 onto tissue section as it is sliced.

The gas supplier 322 can be moved away from the front plate 316 and the tissue slicing area in general, as it is connected to a shaft 326 which can be moved linearly and/or rotationally. This movement of the gas supplier 322 and the shaft 326 can be manual or automated. For example, shaft 326 can be connected to and operated by an actuator which receives control signals from a controller.

In some embodiments, the apparatus includes a tissue collector 332 adapted for collecting the tissue section 330 from the front plate 316 in an automated fashion. The apparatus can comprise an automated tissue collector adapted for movement in relation to the knife, such that the tissue collector can contact the tissue section after slicing. For example, the tissue collector 332 can include one or more apertures 334 through which a reduced pressure (resulting in suction) is provided. Apertures are fluidly connected to a pneumatic source, which may be the same or different than the pneumatic source for the gas supplier (air blade) 322 and front plate apertures 324. When the tissue collector 332 or a portion thereof makes contact with or is sufficiently close to the tissue section 330, the tissue section 330 is held to the tissue collector 332 by the reduced pressure at the apertures 334. The tissue collector 332 may include an extendible portion such as an arm 336 which contacts or comes close to the tissue section 330.

In some embodiments, the tissue collector employs an adhesive material in place of or in addition to reduced pressure. For example, the tissue collector 332 may use an adhesive material 338 such as an adhesive strip, which is removably attached to the tissue collector or an extendible portion thereof by reduced pressure at apertures 334, by an adhesive, by both, and/or by other means. The adhesive material 338 contacts the tissue section 330 and adheres to it. In some embodiments, a first portion of the adhesive material attaches to the tissue section and a second portion of the adhesive material is on the tissue collector but does not attach to or contact the tissue section.

The tissue collector 332 is adapted for movement so that it can collect a tissue section from a microtome and transfer it to a slide. For example, the apparatus can comprise an automated tissue collector attached to a rotating support whose rotation changes position of the automated tissue collector. In the embodiment shown in FIGS. 3A to 3C, the tissue collector 332 is adapted for rotational movement, as it is attached by a shaft 340 to a support 342. The support 342 may be operated manually or by automation, such as by a controller and may rotate the shaft 340, which may contain wiring for the tissue collector 332. The support 342 moves the tissue collector 332 to first, second, and more positions where various operations are performed. As discussed above, the tissue collector 332 may be placed in a position to collect a tissue section 330 from a microtome. After that, the tissue collector can be rotated or otherwise moved so that it is in a position to transfer the tissue section to a slide 344.

After acquiring the tissue section, the arm 336 moves so that the tissue section is positioned near a slide. The arm may be adapted for rotational and/or linear motion. The arm or a portion thereof extends again so that the tissue section and optionally an adhesive material makes contact with the slide, so that the tissue section is deposited on the slide. The arm then retracts but leaves the tissue section adhered to the slide, optionally by operation or assistance of the adhesive material.

In FIG. 3C, the tissue collector 332 has been rotated, and an arm has been extended, so that the tissue section 330 and the adhesive material 338 are in motion toward contacting a slide 344 held by a slide holder 346. The tissue section 330 adheres to the bottom side of slide 344 itself, but the adhesive material 338 makes a stronger attachment to the slide 344 particularly the portion of the adhesive strip which is not attached to the tissue section. At this point, the reduced pressure holding the adhesive material 338 to the apertures 334 of the tissue collector can be halted, thereby releasing the adhesive material 338 from the tissue collector 332. The adhesive material 338 can be removed from the slide (manually or by automation) so as to leave the tissue section 330 on the slide 344 (though a portion of the tissue section may remain on the adhesive strip).

After the tissue section and adhesive strip have been transferred to the slide, the apparatus can be prepared for its next use. The tissue collector 332 can be rotated or otherwise moved to a reloading position, which is at or near an adhesive source such as a dispenser of adhesive materials 338 such as adhesive strips. Reduced pressure is applied at the apertures 334 of the tissue collector 332 in order to pull a new, clean adhesive strip onto the end. The tissue collector can be rotated or otherwise moved before, during or after the slicing of the next tissue section.

In some embodiments, the tissue collector uses a new adhesive strip, of same or different type/size, to clean the microtome blade, microtome blade holder, or both by collecting debris before and/or after the slicing of the next tissue section. In some embodiments, the tissue collector employs an adhesive material in place of or in addition to reduced pressure. For example, the tissue collector 332 may use an adhesive material 338 such as an adhesive strip, which is removably attached to the tissue collector or an extendible portion thereof by reduced pressure at apertures 334, by an adhesive, by both, and/or by other means. The adhesive material 338 contacts the debris and adheres to it. In some embodiments, a first portion of the adhesive material attaches to the debris and a second portion of the adhesive material is on the tissue collector but does not attach to or contact the debris.

The tissue collector 332 is adapted for movement so that it can collect debris from a microtome and transfer it to a slide. For example, the apparatus can comprise an automated tissue collector attached to a rotating support whose rotation changes position of the automated tissue collector. In the embodiment shown in FIGS. 3A to 3C, the tissue collector 332 is adapted for rotational movement, as it is attached by a shaft 340 to a support 342. The support 342 may be operated manually or by automation, such as by a controller and may rotate the shaft 340, which may contain wiring for the tissue collector 332. The support 342 moves the tissue collector 332 to first, second, and more positions where various operations are performed. As discussed above, the tissue collector 332 may be placed in a position to collect debris from a microtome. After that, the tissue collector can be rotated or otherwise moved so that it is in a position to transfer the debris to a slide 344. As noted above, separate or specialized collectors may be included in the microtome system in place of tissue collector 332. For instance, it may be desirable to provide both a tissue collector and a debris collector in order to increase throughput, so that the microtome blade and/or microtome blade holder can be cleaned while the tissue section is being mounted on a slide.

After acquiring the debris, the arm 336 moves so that the debris is positioned near a receptacle. The arm may be adapted for rotational and/or linear motion. The arm or a portion thereof extends again so that the debris and optionally an adhesive material is at or near a receptacle, so that the debris is deposited in the receptacle. The arm then releases the adhesive material (such as by ceasing suction on the adhesive material) and retracts, leaving the debris in the receptacle, optionally by operation or assistance of the adhesive material.

As mentioned, the tissue collector, or a portion thereof such as an arm, may be adapted to move so that it is in position to contact and/or collect the tissue section. The exterior surface of the tissue collector or the arm can be flat, cylindrical, octagonal, or another shape and can be adapted for additional movement. For example, an arm of the tissue collector may be adapted to extend and retract along a track 349 in the main body of the tissue collector 332, so that an arm 336 can be extended to the tissue section or the slide, make contact with the tissue section or the slide, and be retracted, thereby allowing a collecting end of the tissue collector to be in contact with or in sufficient proximity to the tissue section such that the tissue is collected by the tissue collector. In some embodiments, the arm is capable of rotational motion, so that the end can be rotated between positions where it contacts and/or collects the tissue section and where it deposits the tissue section on to a slide. Optionally, the arm or tissue collector is adapted for rotation to other positions where other functions or steps are performed.

In some embodiments of the present apparatus, the slide is held by a slide holder 346, which may also be automated. The slide holder 346 may be adapted for rotational and/or linear motion. The slide holder can transport the slide 344 for processing as desired. The adhesive strip can then be removed, resulting in a tissue section ready for conventional processing (deparaffination, stringency washing, cover slipping, staining, enzymatic treatment, etc.). A positive pressure supplier can be provided so that positive pressure gas can be applied to the tissue section as may be needed for any further processing.

Through the use of the apparatus and method described herein, debris, such as partial tissue sections and/or tissue embedding media, may be transferred from a microtome to a slide without manual action on the tissue section, in an automated manner. Debris may be transferred without manual contact, such as by a user grasping debris by hand or with a handheld instrument. More particularly, freshly-produced debris may be removed from a microtome blade, a microtome blade holder, or both, without manual contact, and/or debris may be placed in a waste receptacle without manual contact. The apparatus and methods also enable slicing and transferring of debris having good two-dimensional stability, with bunching or curling, and avoid waste of tissue sections, by improving the slicing performance of the microtome blade.

Figure 4A:
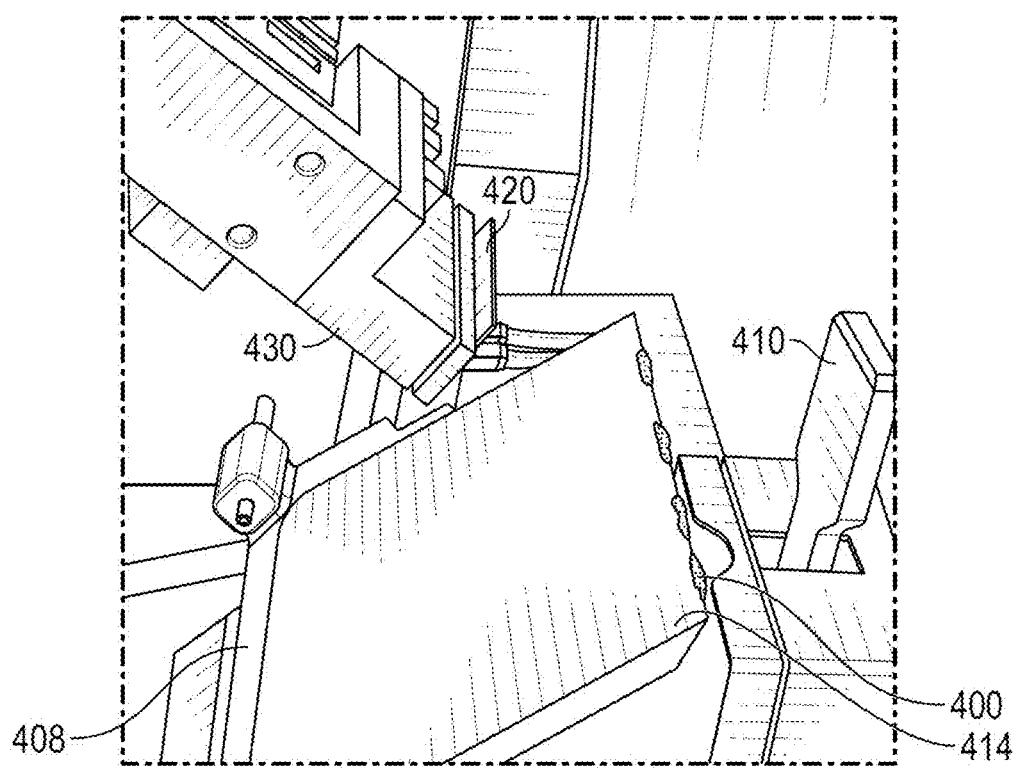
FIGS. 4A to 4C are perspective views of an apparatus for removing waste or debris from a microtome blade and/or microtome blade holder and, optionally, depositing the waste or debris into a waste receptacle.
Figure 4B:
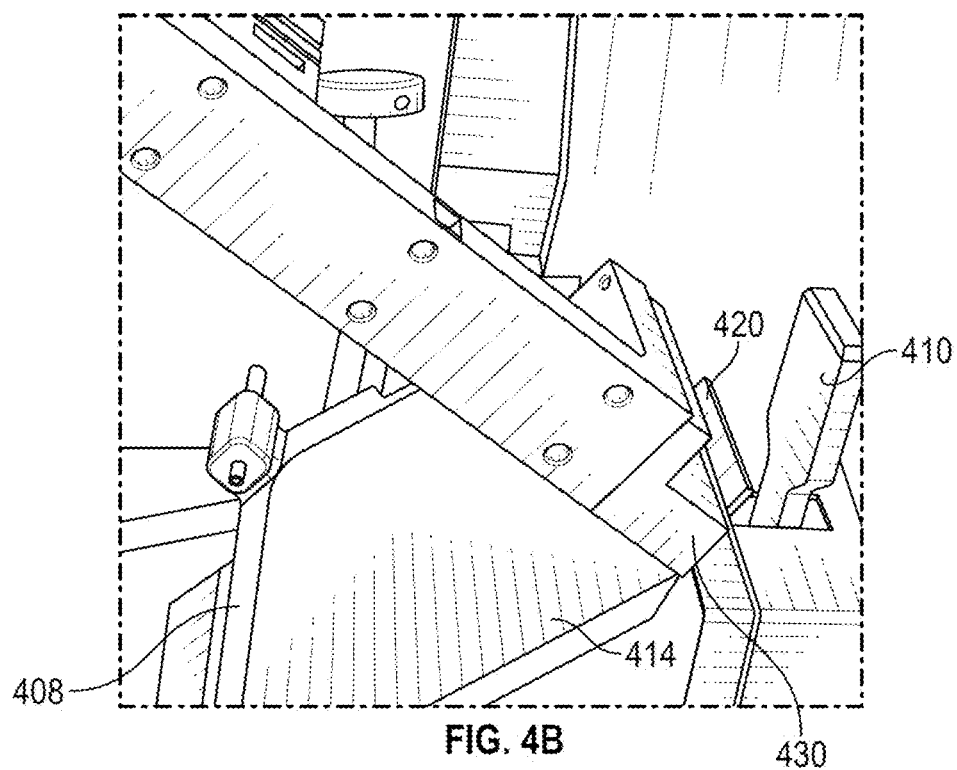
Figure 4C:
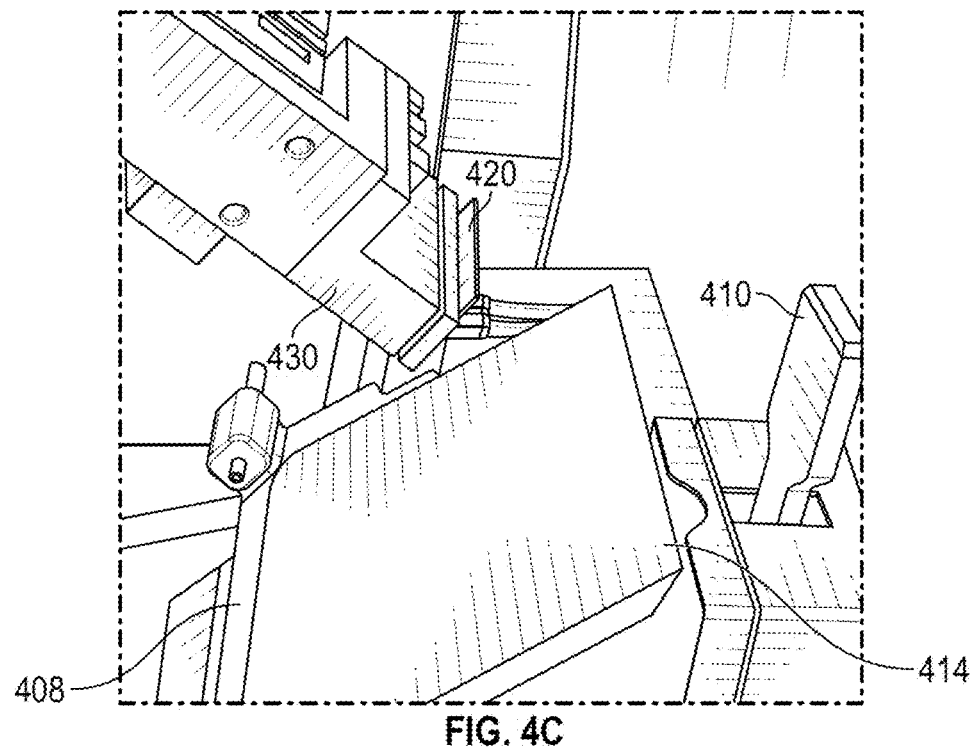

V. Method and Apparatus for Adhesive Based Cleaning of Microtome Blade and Blade Holder FIGS. 4A to 4C are perspective views of an apparatus for removing waste or debris from a microtome blade and/or microtome blade holder and, optionally, depositing the waste or debris into a waste receptacle. In some embodiments, the automated microtome comprises a combined vacuum and tape debris removal system. In FIG. 4A, debris 400 is present on the microtome blade 414. In FIG. 4B, an adhesive material 420, such as an adhesive strip, is moved into contact with the debris 400 on the blade 414 by debris collector arm 430. Debris collector arm can be the same arm as the tissue collector arm described above, or it can be provided as a separate arm. In FIG. 4C, the debris collector arm 430 is withdrawn to remove the debris 400 which is now adhered to the adhesive material 420. The blade 414 is now substantially free of debris, and the debris 400 is now ready for disposal or further processing. In some embodiments, the adhesive material is labeled with an identifier, and the debris or waste can be stored and later identified for further use, such as for genomic analysis.

More particularly, in FIGS. 4A to 4C, the apparatus includes a sample holder 410 which is used to hold samples, such as tissue embedded sectioning media blocks, in place. The apparatus also includes a microtome blade holder 408 to hold the blade 414 in place. In some embodiments, the blade holder 408 may also become contaminated with debris 400 that can be removed by adhesive material 420 and the tissue/debris collector arm 430.

In some embodiments, debris/tissue is present on the microtome blade after a tissue section is trimmed from a tissue block, such as after a vacuum assisted trimming event. It has been observed that some debris may be too small for suction or a puff of air to dislodge it, but can be removed by an adhesive material. In some embodiments, the adhesive material is held by suction to an end effector.

Figure 5:
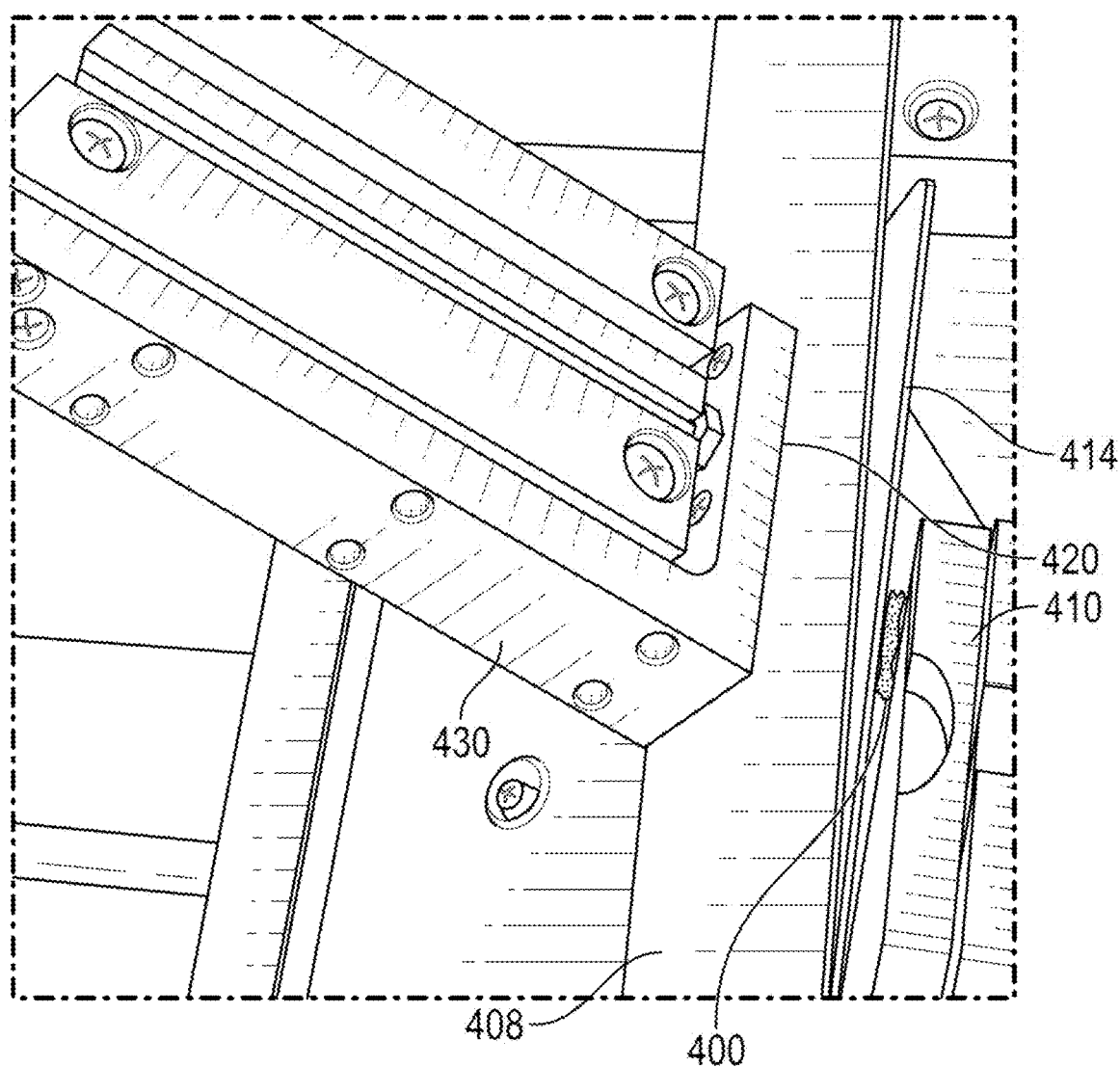
FIG. 5 is a perspective view of a reel to reel tape apparatus for removing waste or debris from a microtome blade and/or microtome blade holder and, optionally, depositing the waste or debris into a waste receptacle.

FIG. 5 is a perspective view a reel to reel tape apparatus for removing waste or debris from a microtome blade and/or microtome blade holder and, optionally, depositing the waste or debris into a waste receptacle. In FIG. 5, debris 400 is present on the microtome blade 414. The debris 400 can be removed by adhesive material 420, such as an adhesive strip or other tape, that is moved into contact with the blade 414 and debris 400 by the debris collector arm 430. In this embodiment, once the debris 400 is present on the adhesive material 420, the adhesive material is advanced to discard the debris and fresh and/or uncontaminated adhesive material is exposed that can be used in subsequent debris removing steps.

More particularly, in FIG. 5 the apparatus includes a sample holder 410 which is used to hold samples, such as tissue embedded sectioning media blocks, in place. The apparatus also includes a microtome blade holder 408 to hold the blade 414 in place. In some embodiments, the blade holder 408 may also become contaminated with debris 400 that can be removed by adhesive material 420 and the debris collector arm 430. In some embodiments, the reel to reel tape system may be integrated into a tissue or debris collector arm of the present technology, such that unreeled tape faces the microtome blade, the microtome blade holder, or both. In other embodiments, the reel to reel tape system may be separate from the tissue/debris collector arm and brought into contact with the microtome blade and/or microtome blade holder by the tissue/debris collector arm or by a different actuator.

EXAMPLES

Example 1

Tissue sections were cut from tissue blocks in order to compare the presently described adhesive based cleaning methods to standard brush based cleaning methods. A Leica 2255 with standard Leica 818 high profile blades was used to cut sections from the tissue blocks. Results are presented in Table 1 where the tissue cutting and blade cleaning procedure is described in column 1, and the sectioning results are described in column 2.

This example demonstrates the advantages of the present methods for cleaning compared to standard brush cleaning, as shown in Table 1. For example, improved tissue section quality (e.g., sections lacking splits) and extended microtome blade longevity are attained when blades are cleaned with the adhesive based approaches of the instant technology. The present methods reduced or resolved splits that occur more frequently with standard cleaning.

TABLE 1

| Cutting and Cleaning Procedure | Result |
| --- | --- |
| Block 1 | |
| Started cutting with a new blade and using the standard brush cleaning method | Split occurred after 49 sections |
| Cleaned the blade with the tape cleaning method and the split went away | New split occurred after another 41 sections |
| Block 2 | |
| Started cutting with a new blade and using tape cleanup after every cut | Unrecoverable split after 75 sections |
| Started cutting with a new blade and using the standard brush cleaning method | Split occurred after 20 sections |
| Cleaned the blade with the tape cleaning method and the split went away | Split occurred after another 24 sections |
| Cleaned the blade with the tape cleaning method and the split went away | Split occurred after another 12 sections |
| Cleaned the blade with the tape cleaning method and the split went away | Split occurred after another 10 sections |
| Cleaned the blade with the tape cleaning method and the split went away | Split occurred after another after 5 sections |
| Cleaned the blade with the tape cleaning method and the split went away | Unrecoverable split occurred after another 51 sections |
| Started cutting with a new blade and using tape cleanup after every cut | Block ended after 84 sections without a detectable split |
| Block 3 | |
| Started cutting with a new blade and using tape cleanup after every cut | Block ended after 200 sections without a detectable split |
| Block 4 | |
| Started cutting with a new blade and using the standard brush cleaning method | Split occurred after 80 sections |
| Cleaned the blade with the tape cleaning method and the split went away | Split occurred after another 60 sections |
| Cleaned the blade with the tape cleaning method and the split went away | Split occurred after another 32 sections |

TABLE 1-continued

| Cutting and Cleaning Procedure | Result |
|---|---|
| Block 5 | |
| Started cutting with a new blade and using the standard brush cleaning method | Block ended after 200 sections without a detectable split |
| Block 6 (very bloody, debris inducing block) | |
| Started cutting with a new blade and using the standard brush cleaning method | Unrecoverable split after 32 sections |
| Started cutting with a new blade and using tape cleanup after every cut | Unrecoverable split after 53 sections |
| Started cutting with a new blade and using the standard brush cleaning method | Unrecoverable split after 47 sections |
| Started cutting with a new blade and using tape cleanup after every cut | Block ended after 80 sections without a detectable split |

EXEMPLARY EMBODIMENTS

Exemplary embodiments provided in accordance with the presently disclosed subject matter include, but are not limited to, the following:

1. An apparatus for slicing a tissue section from a sample, comprising:
a microtome comprising a sample holder, a microtome blade holder and a microtome blade held by the microtome blade holder opposite the sample holder, such that when the sample holder is moved linearly, a sample held by the sample holder is sliced by the microtome blade to form a tissue section;
a debris collector capable of rotational motion, linear motion, or both, wherein the debris collector comprises or is adapted for holding an adhesive material. In some embodiments, a debris collector is adapted for movement to a position where a collecting end of the debris collector is in contact with or in sufficient proximity to the debris such that the debris is collected by the debris collector.

2. The apparatus of embodiment 1 further comprising a positive pressure supplier positioned relative to the microtome blade so as to provide a positive pressure gas on and/or below the tissue section sliced by the microtome blade.

3. The apparatus of embodiment 2, wherein the positive pressure supplier comprises a line of holes to provide a line of gas across a tissue section.

4. The apparatus of embodiment 2, wherein the positive pressure supplier comprises at least two outlets which provide gas at different angles with respect to the sample holder.

5. The apparatus of embodiment 4, wherein a first of the outlets is positioned to provide a stream of positive pressure gas at a non-perpendicular angle toward the sample holder.

6. The apparatus of embodiment 5, wherein a second of the outlets is positioned to provide a stream of positive pressure gas substantially parallel to the sample holder.

7. The apparatus of any of embodiments 1 to 6, further comprising a front plate on the microtome blade holder located such that the tissue section sliced by the microtome blade deposits on or at the front plate.

8. The apparatus of embodiment 7, wherein the front plate has one or more apertures configured for passage of a positive pressure gas and/or gas moved by reduced pressure.

9. The apparatus of embodiment 8, wherein the one or more apertures are configured for passage of a positive pressure gas to form a gas layer adapted to support the tissue section.

10. The apparatus of embodiment 7, wherein the front plate defines a manifold in fluid communication with one or more apertures on a surface of the front plate and/or an outlet directed toward a point of contact between the microtome blade and the tissue sample.

11. The apparatus of any of embodiments 1 to 10, further comprising a control system configured to automate movement and/or operation of the positive pressure supplier.

12. The apparatus of embodiment 1, wherein the collecting end of the debris collector has one or more apertures adapted for providing suction.

13. The apparatus of embodiment 1, wherein the collecting end of the debris collector has an adhesive strip.

14. The apparatus of any of embodiments 11 to 13, wherein the collecting end of the debris collector is extendible.

15. An apparatus for slicing a tissue section from a sample, comprising:
a microtome comprising a sample holder adapted for linear motion, a knife holder and a knife held by the knife holder opposite the sample holder, such that when the sample holder is moved linearly, a sample held by the sample holder is sliced by the knife to form a tissue section, and a front plate on the knife holder located such that the tissue section sliced by the knife deposits on or at the front plate;
a positive pressure supplier positioned relative to the knife so as to provide a positive pressure gas on and/or below the sample holder;
a collector (such as a tissue collector and/or a debris collector) capable of rotational motion, linear motion, or both to a plurality of positions, wherein the collector has an end adapted for collecting debris.

16. The apparatus of embodiment 15, wherein the collector is configured for collecting the debris by an adhesive material.

17. The apparatus of any of embodiments 15 to 16, further comprising an adhesive strip across two reels, wherein the reels are on opposite sides of the microtome blade.

18. The apparatus of any of embodiments 15 to 17, further comprising a controller in communication with the debris collector, wherein the controller is adapted to send a signal to the debris collector to control a motion of the debris collector.

19. The apparatus of embodiment 18, wherein the controller is configured to send a signal to the debris collector to accept or reject the tissue section based on the assess quality of the issue section.

20. A method for cleaning a microtome blade, a microtome blade holder, or both, the method comprising:
collecting debris from the microtome blade, the blade holder, or both on an adhesive material, such as an adhesive strip, wherein the debris can comprise one or more of embedding medium such as paraffin, tissue, and genomic material; and
removing the adhesive material and the collected debris.

21. The method of embodiment 20, wherein the adhesive material is removably attached to a collecting end of a collector, and the collector is adapted for movement to a position where a collecting end of the collector is in contact with or in sufficient proximity to the microtome blade, the blade holder, or both such that the debris is collected by the collector.

22. The method of embodiment 21, wherein the collector comprises an extendible arm adapted to move the adhesive material into contact with the debris.

23. The method of embodiment 21 or 22, wherein the adhesive material is removably attached to the collecting end by suction.

24. The method of any of the foregoing embodiments, wherein the collector transports the debris to a waste receptacle and releases the adhesive material and collected debris in the waste receptacle, such as by ceasing suction on the adhesive material.

25. The method of any of the foregoing embodiments, wherein the adhesive material has a barcode or other identification.

26. The method of embodiment 25, wherein the method further comprises identifying the adhered debris based on the barcode or other identification.

27. The method of any of the foregoing embodiments, wherein the adhesive material is an adhesive strip held between two reels located on opposite sides of the microtome blade such that an unreeled portion of the adhesive strip extends across the microtome blade, and a first side of the adhesive strip faces the microtome blade, wherein the first side is at least partially coated with adhesive.

28. The method of embodiment 27, further comprising moving the adhesive strip into contact with the debris by extending an extendible arm of a collector so that it contacts a second side of the adhesive strip, wherein the second side is not coated with adhesive.

29. The method of any of the foregoing embodiments, further comprising the step of cleaning the microtome blade, the blade holder, or both, with a liquid-holding medium such as a fabric, sponge, wipe, strip, or cloth removably attached to the extendible arm.

30. The method of claim 29, wherein the medium holds a reagent such as DNase, RNase, pepsin, xylene or other reagent.

31. A method of collecting and transferring a tissue section sliced by a microtome, the method comprising:
    collecting a tissue section sliced from a tissue sample on an adhesive material, such as an adhesive strip, wherein the adhesive material has a barcode or other identification; and
    removing the adhesive material and the collected tissue section from the microtome.

32. The method of embodiment 31, further comprising identifying the tissue section on the adhesive material based on the barcode or other identification.

33. The method of embodiment 31 or 32, wherein the adhesive material is removably attached to a collecting end of a collector, and the collector is adapted for movement to a position where a collecting end of the collector is in contact with or in sufficient proximity to the microtome blade, the blade holder, or both such that the tissue section is collected by the collector.

34. The method of embodiment 33, wherein the collector comprises an extendible arm adapted to move the adhesive material into contact with the tissue section.

35. The method of embodiment 33 or 34, wherein the adhesive material is removably attached to the collecting end by suction.

36. The method of any of embodiments 31 to 35, wherein the collector transports the tissue section to a slide and deposits the adhesive material and collected tissue section on the slide.

37. A method for cleaning a microtome blade, a microtome blade holder, or both, the method comprising:
    cleaning the microtome blade, the microtome blade holder, or both, with a liquid-holding medium removably attached to a collector comprising an extendible arm adapted to move the liquid holding medium into contact with the microtome blade, microtome blade holder, or both.

The foregoing description of exemplary or preferred embodiments should be taken as illustrating, rather than as limiting the present invention as defined by the embodiments. As will be readily appreciated, numerous variations and combinations of the features set forth above can be utilized without departing from the present invention as set forth in the embodiments. Such variations are not regarded as a departure from the scope of the invention, and all such variations are intended to be included within the scope of the following embodiments. All references cited herein are incorporated by reference in their entireties.

We claim:

1. A method for cleaning a microtome blade, a microtome blade holder, or both, the method comprising:
    collecting debris from at least one of the microtome blade, or the blade holder, on an adhesive material, wherein the debris comprises one or more component selected from the group consisting of embedding medium, paraffin, tissue, and genomic material; and
    removing the adhesive material and the collected debris.

2. The method of claim 1, wherein the adhesive material is removably attached to a collecting end of a collector, and the collector is adapted for movement to a position where a collecting end of the collector is in contact with or in sufficient proximity to at least one of the microtome blade, or the blade holder, such that the debris is collected by the collector.

3. The method of claim 1, wherein the collector comprises an extendible arm adapted to move the adhesive material into contact with the debris.

4. The method of claim 2, wherein the adhesive material is removably attached to the collecting end by suction.

5. The method of claim 1, wherein the tissue collector transports the debris to a receptacle and releases the adhesive material and collected debris in the receptacle.

6. The method of claim 1, wherein the adhesive material has a identifier.

7. The method of claim 6, wherein the method further comprises identifying the adhered debris based on the identifier.

8. The method of claim 1, wherein the adhesive material is an adhesive strip held between reels located on opposite sides of the microtome blade such that an unreeled portion of the adhesive strip extends across the microtome blade, and a first side of the adhesive strip faces the microtome blade, wherein the first side is at least partially coated with adhesive.

9. The method of claim 8, further comprising moving the adhesive strip into contact with the debris by extending an extendible arm of a collector so that the extendible arm contacts a second side of the adhesive strip, wherein the second side is not coated with adhesive.

10. The method of claim 3, further comprising the step of cleaning at least one of the microtome blade, or the microtome blade holder, with a liquid-holding medium removably attached to the extendible arm.

11. The method of claim 10, wherein the liquid holding medium is a fabric, sponge, wipe, strip, or cloth.

12. The method of claim 11, wherein the medium holds a reagent.

13. The method of claim 12, wherein the reagent is selected from the group consisting of DNase, RNase, pepsin, xylene and mixtures thereof.

14. A method of collecting and transferring a tissue section sliced by a microtome, the method comprising:
  collecting a tissue section sliced from a tissue sample on an adhesive material, wherein the adhesive material has an identifier; and
  removing the adhesive material and the collected tissue section from the microtome.

15. The method of claim 14, further comprising identifying the tissue section on the adhesive material based on the identifier.

16. An apparatus for slicing a tissue section from a sample, comprising:
  a microtome comprising a sample holder, a microtome blade holder and a microtome blade held by the microtome blade holder opposite the sample holder, such that when the sample holder is moved linearly, a sample held by the sample holder is sliced by the microtome blade to form a tissue section;
  a debris collector capable of at least one of rotational motion, or linear motion, wherein the debris collector comprises or is adapted for holding an adhesive material.

17. The apparatus of claim 16, wherein the debris collector comprises an extendible arm adapted for movement to a position where a collecting end of the debris collector is in contact with or in sufficient proximity to the debris such that the debris is collected by the debris collector.

18. The apparatus of claim 16, wherein the debris collector comprises an adhesive strip held between reels located on opposite sides of the microtome blade such that an unreeled portion of the adhesive strip extends across the microtome blade, and a first side of the adhesive strip faces the microtome blade, wherein the first side is at least partially coated with adhesive.

19. The apparatus of claim 17, wherein the reels are held by a reel holder configured for moving the adhesive tape into contact with and away from the microtome blade.

20. A method for cleaning a microtome blade, a microtome blade holder, or both, the method comprising:
  cleaning at least one of the microtome blade, or the microtome blade holder, with a liquid-holding medium removably attached to a collector comprising an extendible arm adapted to move the liquid holding medium into contact with at least one of the microtome blade, or the microtome blade holder.

21. The method of claim 6, wherein the identifier comprises a barcode.

22. The method of claim 21, wherein the method further comprises identifying the adhered debris based on the barcode.

23. The method of claim 14, wherein the identifier comprises a barcode.

24. The method of claim 23, further comprising identifying the tissue section on the adhesive material based on the barcode.

* * * * *